United States Patent
Nishihara et al.

(10) Patent No.: US 8,667,218 B2
(45) Date of Patent: Mar. 4, 2014

(54) STORAGE APPARATUS COMPRISING RAID GROUPS OF RAID 1 SERIES AND CONTROL METHOD OF WRITING TO RAID GROUP OF RAID 1 SERIES

(75) Inventors: Yusuke Nishihara, Odawara (JP); Yuko Matsui, Odawara (JP); Hiroshi Izuta, Odawara (JP)

(73) Assignee: Hitachi, Ltd., Tokyo (JP)

( * ) Notice: Subject to any disclaimer, the term of this patent is extended or adjusted under 35 U.S.C. 154(b) by 901 days.

(21) Appl. No.: 12/812,620

(22) PCT Filed: Mar. 8, 2010

(86) PCT No.: PCT/JP2010/001616
§ 371 (c)(1),
(2), (4) Date: Jul. 13, 2010

(87) PCT Pub. No.: WO2011/111089
PCT Pub. Date: Sep. 15, 2011

(65) Prior Publication Data
US 2011/0296102 A1   Dec. 1, 2011

(51) Int. Cl.
*G06F 12/00*   (2006.01)

(52) U.S. Cl.
USPC ............... 711/114; 711/4; 711/118; 711/154; 711/158

(58) Field of Classification Search
USPC .............................. 711/114, 4, 118, 154, 158
See application file for complete search history.

(56) References Cited

U.S. PATENT DOCUMENTS

| | | | | |
|---|---|---|---|---|
| 5,611,069 A * | 3/1997 | Matoba | ......................... | 711/114 |
| 6,959,373 B2 * | 10/2005 | Testardi | ......................... | 711/203 |
| 7,284,086 B2 * | 10/2007 | Kanai | ............................. | 711/112 |
| 7,346,733 B2 * | 3/2008 | Kitamura | ...................... | 711/114 |
| 7,711,897 B1 * | 5/2010 | Chatterjee et al. | ............. | 711/114 |
| 7,802,063 B1 * | 9/2010 | Chatterjee et al. | ............ | 711/156 |
| 7,873,782 B2 * | 1/2011 | Terry et al. | .................... | 711/114 |
| 7,953,939 B2 * | 5/2011 | Nakamura et al. | ............. | 711/154 |
| 7,975,168 B2 * | 7/2011 | Morita et al. | ................. | 714/6.22 |
| 7,991,969 B1 * | 8/2011 | Chatterjee et al. | ............. | 711/156 |
| 8,473,672 B2 * | 6/2013 | Moshayedi et al. | .......... | 711/103 |
| 8,510,497 B2 * | 8/2013 | Moshayedi et al. | .......... | 711/103 |

(Continued)

FOREIGN PATENT DOCUMENTS

| | | |
|---|---|---|
| JP | 2008-197864 | 8/2008 |
| JP | 2009-129201 | 6/2009 |
| JP | 2009-217519 | 9/2009 |

*Primary Examiner* — Stephen Elmore
(74) *Attorney, Agent, or Firm* — Brundidge & Stanger, P.C.

(57) ABSTRACT

A RAID group of RAID 1 series comprises one or more pairs of first storage devices and second storage devices. A storage apparatus reads data from the entire area of a first storage block group including the write destination of write target data in the first storage device. The storage apparatus, in accordance with the write target data and staging data which is the read data, generates one or more data units each of which is the data configured of the write target data or the copy of the same and the staging data part or the copy of the same and of the same size as the first storage block group. The controller writes any of the one or more data units to the first storage block group in the first storage device and, at the same time, writes any of the one or more data units to the second storage block group corresponding to the first storage block group and of the same size as the same in the second storage device.

14 Claims, 18 Drawing Sheets

(56) References Cited

U.S. PATENT DOCUMENTS

| | | | |
|---|---|---|---|
| 2005/0097273 A1* | 5/2005 | Kanai | 711/114 |
| 2005/0198434 A1* | 9/2005 | Uchiumi et al. | 711/113 |
| 2006/0259709 A1* | 11/2006 | Uchiumi et al. | 711/147 |
| 2008/0005468 A1* | 1/2008 | Faibish et al. | 711/114 |
| 2008/0005502 A1* | 1/2008 | Kanai | 711/154 |
| 2008/0195832 A1 | 8/2008 | Takada et al. | |
| 2009/0138672 A1 | 5/2009 | Katsuragi et al. | |
| 2009/0150756 A1* | 6/2009 | Mori et al. | 714/807 |
| 2009/0228652 A1 | 9/2009 | Takemoto | |
| 2010/0070733 A1* | 3/2010 | Ng et al. | 711/171 |
| 2011/0113194 A1* | 5/2011 | Terry et al. | 711/114 |

* cited by examiner

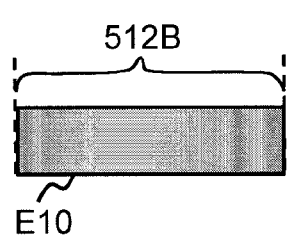
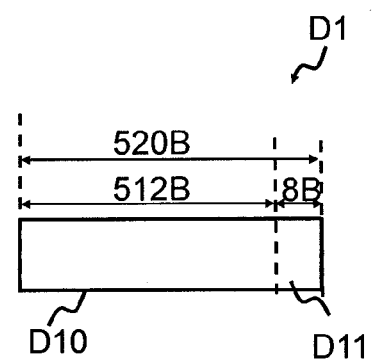
FIG. 1A
FIG. 1B

| | Data | Map | Queue | Attribute | Flag |
|---|---|---|---|---|---|
| SG table #1 | Intermediate dirty data | Dirty map | Intermediate dirty queue | W side | 0 |
| SG table #2 | Staging data | Staging map | Clean queue | R side | 1 |
| SG table #3 | Physical dirty data | Dirty map | Physical dirty queue | R side | 1 |

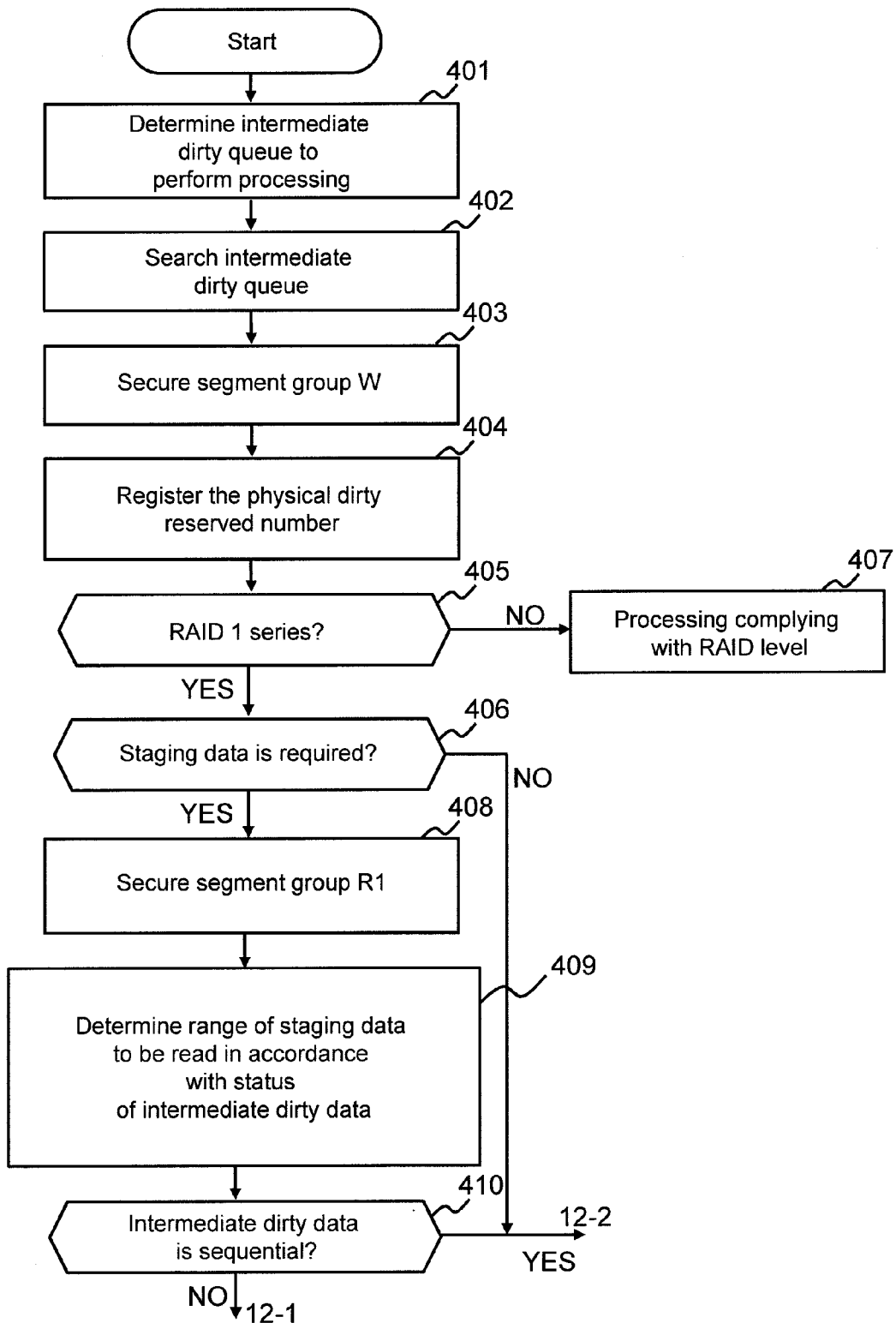

FIG. 16

| # | | Data | Map | Queue | Attribute | Flag |
|---|---|---|---|---|---|---|
| 1 | SG table #1 | Intermediate dirty data | Dirty map | Intermediate dirty queue | W side | 0 |
| 2 | SG table #1 | Intermediate dirty data | Dirty map | Intermediate dirty queue | W side | 0 |
| 3 | SG table #1 | Intermediate dirty data | Dirty map | Intermediate dirty queue | W side | 0 |
| 4 | SG table #1 | Intermediate dirty data | Dirty map | Intermediate dirty queue | W side | 0 |
| 5 | SG table #1 | Intermediate dirty data | Dirty map | Intermediate dirty queue | W side | 0 |
| 6 | SG table #1 | Intermediate dirty data | Dirty map | Intermediate dirty queue | W side | 0 |
| 7 | SG table #1 | Intermediate dirty data | Dirty map | Intermediate dirty queue | W side | 0 |
| | SG table #2 | None | None | Clean queue | R side | 0 |
| 8 | SG table #1 | Intermediate dirty data | Dirty map | Intermediate dirty queue | W side | 0 |
| | SG table #2 | Staging data | Staging map | Clean queue | R side | 1 |
| 9 | SG table #1 | Intermediate dirty data | Dirty map | Intermediate dirty queue | W side | 0 |
| | SG table #2 | Staging data | Staging map | Clean queue | R side | 1 |
| 10 | SG table #1 | Intermediate dirty data | Dirty map | Intermediate dirty queue | W side | 0 |
| | SG table #2 | Staging data | Staging map | Clean queue | R side | 1 |
| 11 | SG table #1 | Intermediate dirty data | Dirty map | Intermediate dirty queue | W side | 0 |
| | SG table #2 | Staging data | Staging map | Clean queue | R side | 1 |

FIG. 17

| | | Data | Map | Queue | Attribute | Flag |
|---|---|---|---|---|---|---|
| 12 | SG table #1 | Intermediate dirty data | Dirty map | Intermediate dirty queue | W side | 0 |
| | SG table #2 | Staging data | Staging map | Clean queue | R side | 1 |
| | SG table #3 | None | None | Physical dirty queue | R side | 0 |
| 13 | SG table #1 | Intermediate dirty data | Dirty map | Intermediate dirty queue | W side | 0 |
| | SG table #2 | Physical dirty data | Dirty Map+ | Clean queue | R side | 1 |
| | SG table #3 | Physical dirty data | Dirty Map+ | Physical dirty queue | R side | 1 |
| 14 | SG table #1 | Intermediate dirty data | Dirty map | Intermediate dirty queue | W side | 0 |
| | SG table #2 | Physical dirty data | Dirty Map+ | Clean queue | R side | 1 |
| | SG table #3 | Physical dirty data | Dirty Map+ | Physical dirty queue | R side | 1 |
| 15 | SG table #1 | Intermediate dirty data | Dirty map | Intermediate dirty queue | W side | 0 |
| | SG table #2 | Physical dirty data | Dirty Map+ | Physical dirty queue | R side | 1 |
| | SG table #3 | Physical dirty data | Dirty Map+ | Physical dirty queue | R side | 1 |
| 16 | SG table #1 | — | — | Free queue | — | 0 |
| | SG table #2 | Physical dirty data | Dirty Map+ | Physical dirty queue | R side | 1 |
| | SG table #3 | Physical dirty data | Dirty Map+ | Physical dirty queue | R side | 1 |

STORAGE APPARATUS COMPRISING RAID GROUPS OF RAID 1 SERIES AND CONTROL METHOD OF WRITING TO RAID GROUP OF RAID 1 SERIES

TECHNICAL FIELD

This invention relates to a storage control apparatus, specifically to the control for writing to a RAID (Redundant Array of Independent (or Inexpensive) Disks) group of RAID 1 series.

BACKGROUND ART

A storage apparatus (e.g. a disk array apparatus) generally comprises multiple HDDs (hard disk drives) and a controller which controls access to the multiple HDDs (hereinafter, a disk controller is abbreviated to a "DKC"). This type of storage apparatus usually comprises one or more RAID groups configured of multiple HDDs. The DKC, in accordance with the RAID level of the RAID groups, accesses the RAID groups.

As a RAID level, for example, RAID 1 exists (Patent Literature 1). A RAID group to which RAID 1 is applied is configured of a master HDD and a mirror HDD. The DKC receives write target data from a host apparatus, and duplicates the write target data. Then, the DKC writes one type of the duplicated data to one HDD (hereinafter referred to as a master HDD), and writes the other type of data to the other HDD (hereinafter referred to as a mirror HDD).

CITATION LIST

Patent Literature

Patent Literature 1: Japanese Unexamined Patent Application Publication No. 2009-217519

SUMMARY OF INVENTION

Technical Problem

Generally, the storage area provided by the HDDs is configured of multiple sub storage areas (hereinafter referred to as "blocks") and, to the HDDs, data is written in units of block size. Depending on the type of HDDs, the size of the writing unit to the HDDs might be different from the size of the unit of the write target data to the HDDs.

For example, as an HDD, an SATA (Serial ATA (Advanced Technology Attachment))-HDD exists. As shown in FIG. 1A, the writing unit of the SATA-HDD (the size of one block E10) is 512 B (bytes). This is, as shown in FIG. 1B, the same as the size of one data element D10 from the host apparatus (512 B) (the write target data from the host apparatus is configured of one or more data elements, and the data element D10 shown in the figure is one of the one or more data elements).

However, as shown in FIG. 1B, the DKC, from the perspective of reliability improvement, adds a guarantee code D11 (e.g. an ECC (Error Correcting Code)) to the data element D10. The size of a guarantee code D11 is, for example, 8 B (bytes). By these, a 520 B data set D1 is generated. Therefore, the size of a data set D1 which the DKC writes to the SATA-HDD (the size of the unit of the write target data) is larger than the size of the writing unit of the SATA-HDD (the size of a block) by 8 B.

Therefore, the data set D1 does not fit into one block in the SATA-HDD and, as shown in FIG. 2A, comes to exist across the two blocks E10 and E11.

In this case, for writing data in writing units of the SATA-HDD, as shown in FIG. 2B, by adding data to the data set D1, it is required to create a data unit F1 of the same data size as the total size of the two blocks E10 and E11 as the writing destination of the data set D1. For creating the data unit F1, the DKC performs the processing below.

(*) The DKC reads a data [element] E1 on the head stored in the part to which the data set D1 is not written in the block E10, and adds the data E1 to the head of the data set D1.

(*) The DKC reads a data [element] E2 on the end stored in the part to which the data set D1 is not written in the block E11, and adds the data E2 to the end of the data set D1.

That is, for creating a data unit F1, the maximum of two times of read from the SATA-HDD is required. This has a problem of increasing the load on the DKC and the SATA-HDD respectively.

Then, this problem is especially serious in cases where the RAID group is configured of SATA-HDDs and, at the same time, the RAID level is RAID 1. This is because the maximum of two times of read is performed for the two HDDs (the master HDD and the mirror HDD) respectively. This is more specifically described below. Note that, in the description below, the data which is read for creating a data unit and is added to the data set is, for convenience, referred to as the "additional data."

As shown in FIG. 3, the storage apparatus 1A comprises a RAID group 20 and a DKC 10. The DKC 10 comprises a frontend interface apparatus (FE-IF) 11 and a cache memory 12. The FE-IF is a communication interface apparatus corresponding to a host apparatus 30. The RAID group 20, whose RAID group level is RAID 1, is a pair of a master HDD 21 and a mirror HDD 22. Both the HDDs 21 and 22 are SATA-HDDs.

As shown by an arrow a in FIG. 3, the FE-IF 11 receives a data element from the host apparatus 30. The data element is stored in the cache memory 12. The DKC 10, by adding a guarantee code (e.g. an ECC) to the data element, generates a data set D1.

Next, the DKC 10, as shown by arrows b1 and b2 in FIG. 3, generates two copies of the data set D1. That is, a data set D2 for the master and a data set D3 for the mirror are generated.

Next, the DKC 10 performs two times of read for the master HDD 21 and the mirror HDD 22 respectively, that is, performs a total of four times of read. As more specifically described, as shown by arrows c1 and c2 in FIG. 3, the DKC 10 reads additional data [elements] E1 and E2 from the master HDD 21, and adds the read additional data [elements] E1 and E2 to the data set D2 for the master. By these, a data unit F1 for the master is generated.

Furthermore, the DKC 10, as shown by arrows c3 and c4 in FIG. 3, reads additional data [elements] E3 and E4 from the mirror HDD 22, and adds the read additional data [elements] E3 and E4 to the data set D2 for the mirror. By these, a data unit F2 for the mirror is generated.

The DKC 10, as shown by an arrow d1 in FIG. 4, writes the created data unit F1 to the master HDD 21 and, at the same time, as shown by an arrow d2 in FIG. 4, writes the created data unit F2 to the mirror HDD 22.

According to the above-mentioned flow, as described above, the maximum of four times of read is performed. As the number of times of data read is larger, the load both on the SATA-HDD and on the DKC 10 becomes heavier. This deteriorates the processing performance of the storage apparatus 1.

This could also occur, as well as RAID 1, to other RAID levels of RAID 1 series. For example, in case of RAID 10 (also referred to as "RAID 1+0), as multiple sets of master HDDs and mirror HDDs exist in one RAID group, the effect of the above-mentioned problem is considered to be even larger compared with the case of RAID 1.

Furthermore, the above-mentioned problem could also occur, as well as SATA-HDDs, to other types of physical storage devices whose writing units are different from the unit sizes of the write target data.

Therefore, the purpose of this invention is to improve the processing performance of the storage apparatus whose size of the writing unit of physical storage devices configuring RAID groups of RAID 1 series is different from the unit size of the write target data.

Solution to Problem

The storage apparatus comprises a RAID (Redundant Array of Independent (or Inexpensive) Disks) group configured of multiple physical storage devices and a controller which, in accordance with the RAID level of the RAID group, controls data write to the RAID group and data read from the RAID group. The RAID group is a RAID group of RAID 1 series which comprises one or more pairs of first storage devices and second storage devices. The unit size of write target data and the size of the writing unit of the storage device are different. The storage area which the storage device provides is configured of multiple storage blocks. The size of each storage block is the same as the size of the writing unit of the storage device. The controller reads data from the entire area of a first storage block group including the write destination of the write target data in the first storage device. The controller, in accordance with the write target data and staging data which is the read data of the same, generates one or more data units each of which is the data configured of the write target data or the copy of the same and the staging data part or the copy of the same and of the same size as the first storage block group. The controller writes any of the one or more data units to the first storage block group in the first storage device and, at the same time, writes any of the one or more data units to the second storage block group corresponding to the first storage block group and of the same size as the same in the second storage device.

The write target data, for example, may be the data created by adding another type of data (e.g. a guarantee code) to the data from the host apparatus, or may also be the data from the host apparatus itself. The host apparatus is an external apparatus of the storage apparatus.

BRIEF DESCRIPTION OF DRAWINGS

FIG. 1A is a diagram showing the size of a block configuring an HDD. FIG. 1B is a diagram showing the size of a data set which the DKC writes to the HDD.

FIG. 14 is a flowchart showing a part of the flow of the write processing performed for a RAID group of RAID 1 related to this embodiment.

FIG. 16 shows a segment table of the respective steps from 401 to 411 in the flowchart of FIG. 14 and FIG. 15.

FIG. 17 shows a segment table of the respective steps from 412 to 416 in the flowchart of FIG. 12.

DESCRIPTION OF EMBODIMENTS

An embodiment of this invention is described below. Note that, in this embodiment, for simplifying the description, the examples below are assumed to be applied.

(*) Physical storage devices are HDDs. The controller is a disk controller (hereinafter referred to as a DKC) which controls the access to the HDDs.

(*) The RAID level of RAID groups is RAID 1. A RAID group is a pair of a master HDD and a mirror HDD.

(*) Each of the master HDD and the mirror HDD is an SATA-HDD.

(*) Each of the sub storage areas configuring the storage area provided by the SATA-HDDs is referred to as a "block."

(*) The size of a block is assumed to be 512 B (bytes).

(*) The size of each data element configuring the data which the DKC receives from the host apparatus is assumed to be 512 B (bytes). The size of a data element is the minimum size of the data provided by the host apparatus to the storage apparatus.

(*) The size of a guarantee code (e.g. an ECC (Error Correcting Code)) is assumed to be 8 B (bytes).

This embodiment, in the write processing to the RAID group of RAID 1, can make data read from either the master HDD or the mirror HDD unnecessary and, at the same time, can make the number of times of data read from the RAID group up to one. Hereinafter, with reference to FIG. 5 to FIG. 8, the overview of the write processing is described. Note that, in the description below, the DKC 100 in the storage apparatus 1B related to this embodiment comprises the cache memory 120, that the cache memory 120 is configured of multiple segments, that the attribute of the segment storing the data exchanged with the host apparatus 300 is referred to as a write side (hereinafter referred to as a W side), and that the attribute of the segment storing the data exchanged with the master HDD 210 and the mirror HDD 220 is referred to as a read side (hereinafter referred to as an R side). Furthermore, the data which the DKC 100 receives from the host apparatus 300 is assumed to be configured of one data element.

Figure 2A:
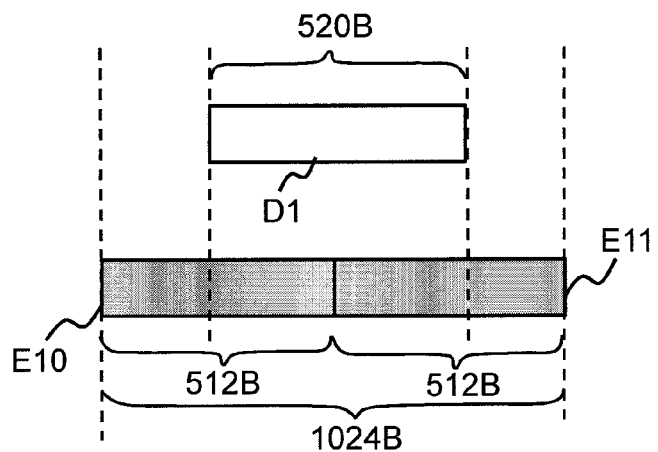
FIG. 2A shows that the size of the data set which the DKC writes to the HDD is larger than the size of a block.
Figure 2B:
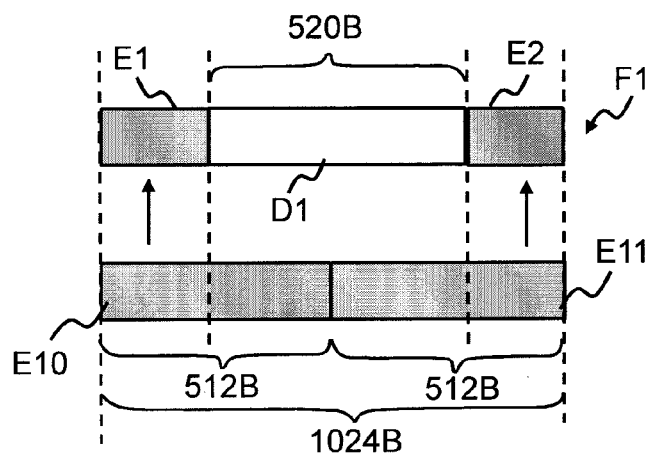
FIG. 2B is a diagram for describing the conventional processing for generating a data unit of the same size as the total size of the two blocks.
Figure 3:
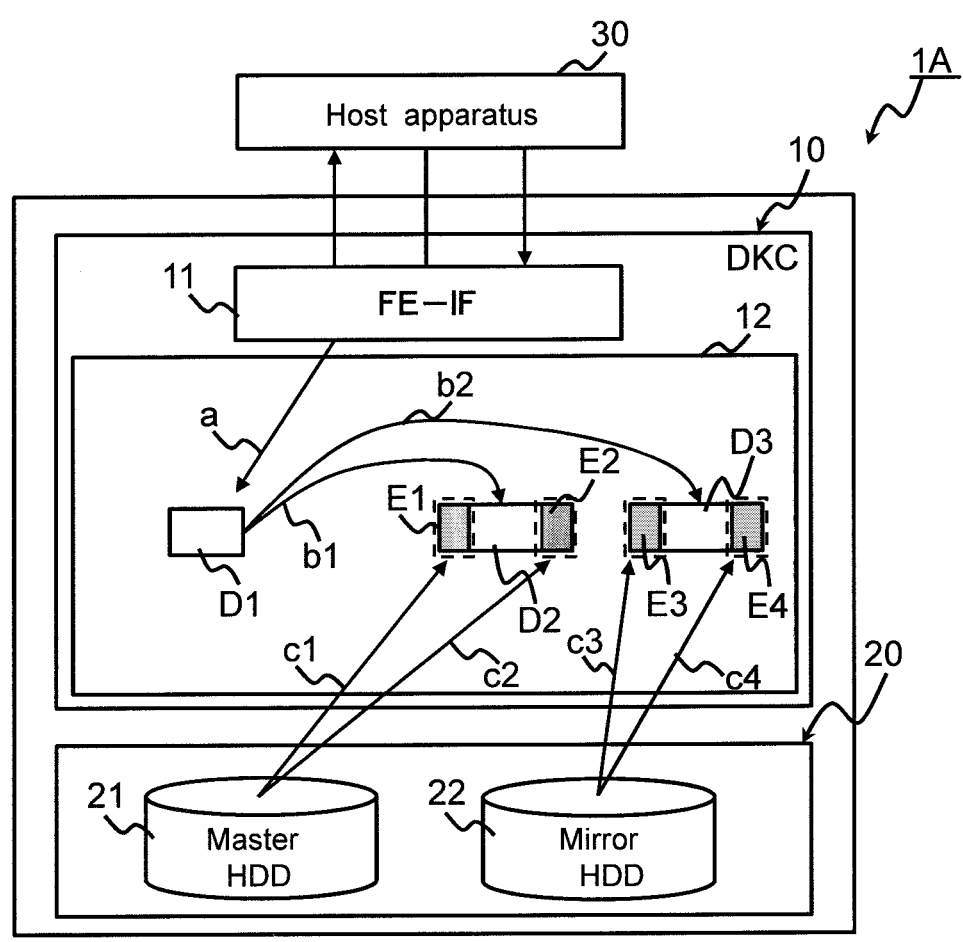
FIG. 3 shows a part of the conventional write processing for a RAID group of RAID 1.
Figure 4:
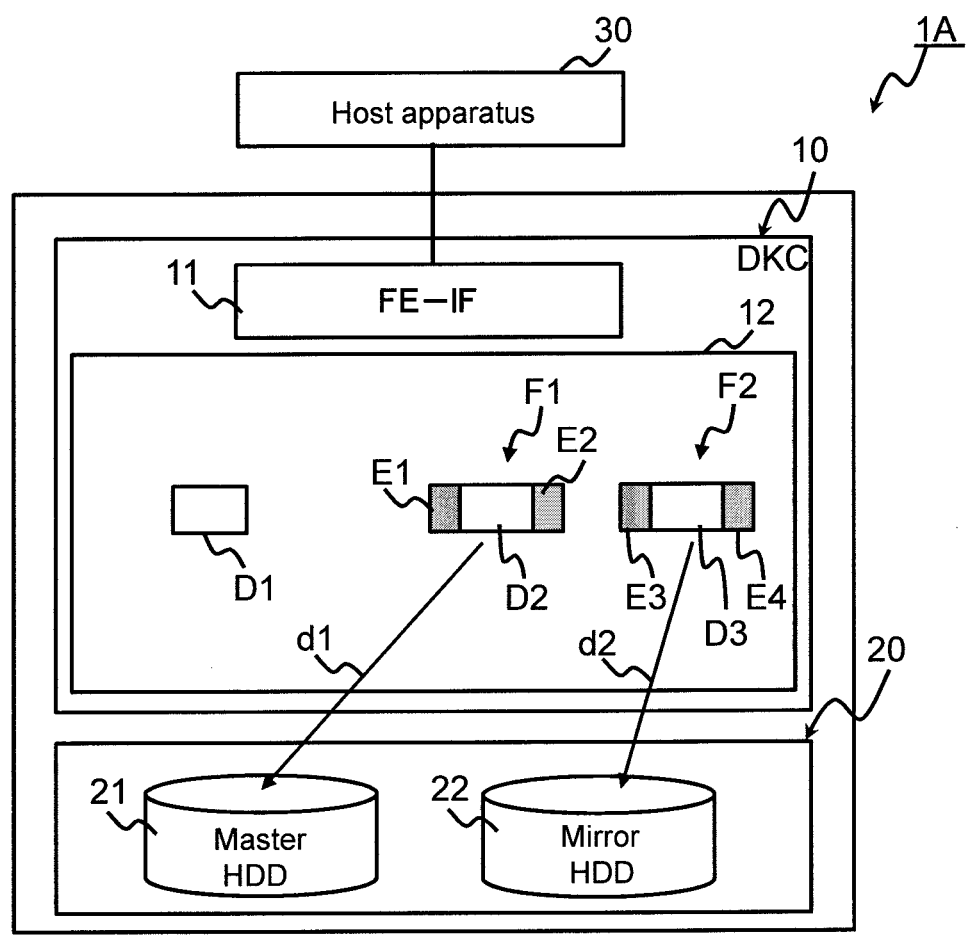
FIG. 4 shows the remaining part of the above-mentioned conventional write processing.
Figure 5:
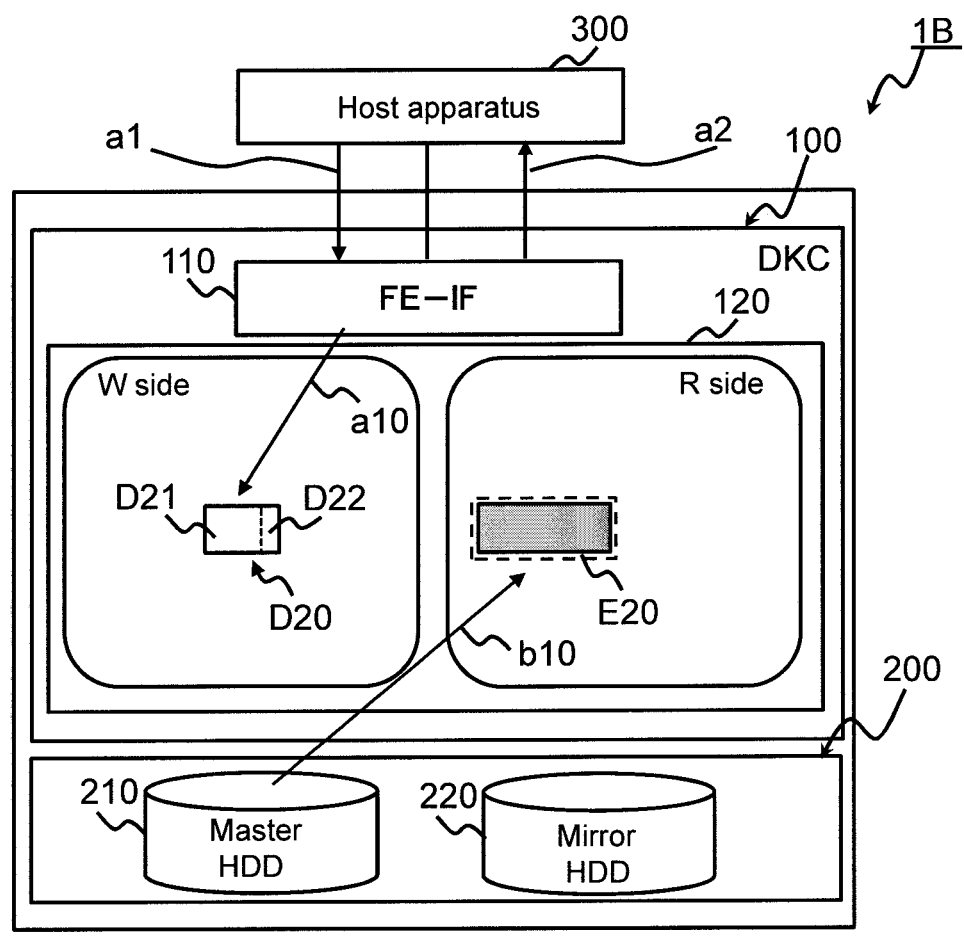
FIG. 5 shows a first part of the write processing performed for a RAID group of RAID 1 in an embodiment of this invention.

Firstly, the DKC 100, as shown by an arrow a01 in FIG. 5, receives a write request and a data element D21 accompanying the same from the host apparatus 300. The DKC 100, as shown by an arrow a10 in FIG. 5, stores the data element D21 from the host apparatus 300 in the segment (the attribute of the segment storing the data element D21 is the W side). Then, the DKC 100, as shown by an arrow a02 in FIG. 5, transmits a response (e.g. completion of the write) to the host apparatus 300.

Next, the DKC 100 adds a guarantee code (e.g. an ECC (Error Correcting Code)) to the stored data element D21, and generates a data set D20. The size of the data set D20 is 520 B (512 B+8 B). The data set D20 is the write target data.

Next, the DKC 100, as shown by an arrow b10 in FIG. 5, from the entire area of the block group (two blocks in this case) including the write destination of the data set D20 in the master HDD 210 (or mirror HDD 220), reads a data [element] E20, and stores the data [element] E20 in the segment (the attribute of the segment storing the data [element] E20 is the R side). The data read from the HDD is only this one time. Hereinafter, the data read from the HDD to the cache memory 120 is referred to as "staging data."

Figure 6:
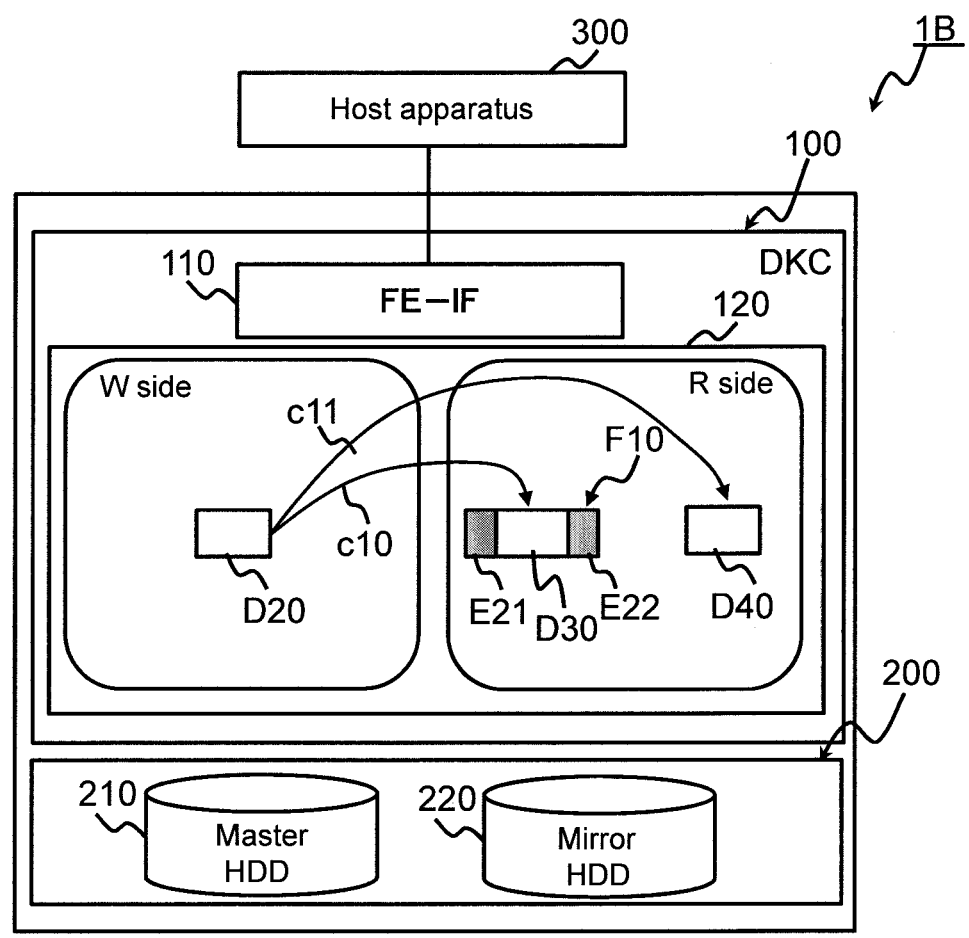
FIG. 6 shows a second part of the above-mentioned write processing related to this embodiment.
Figure 7:
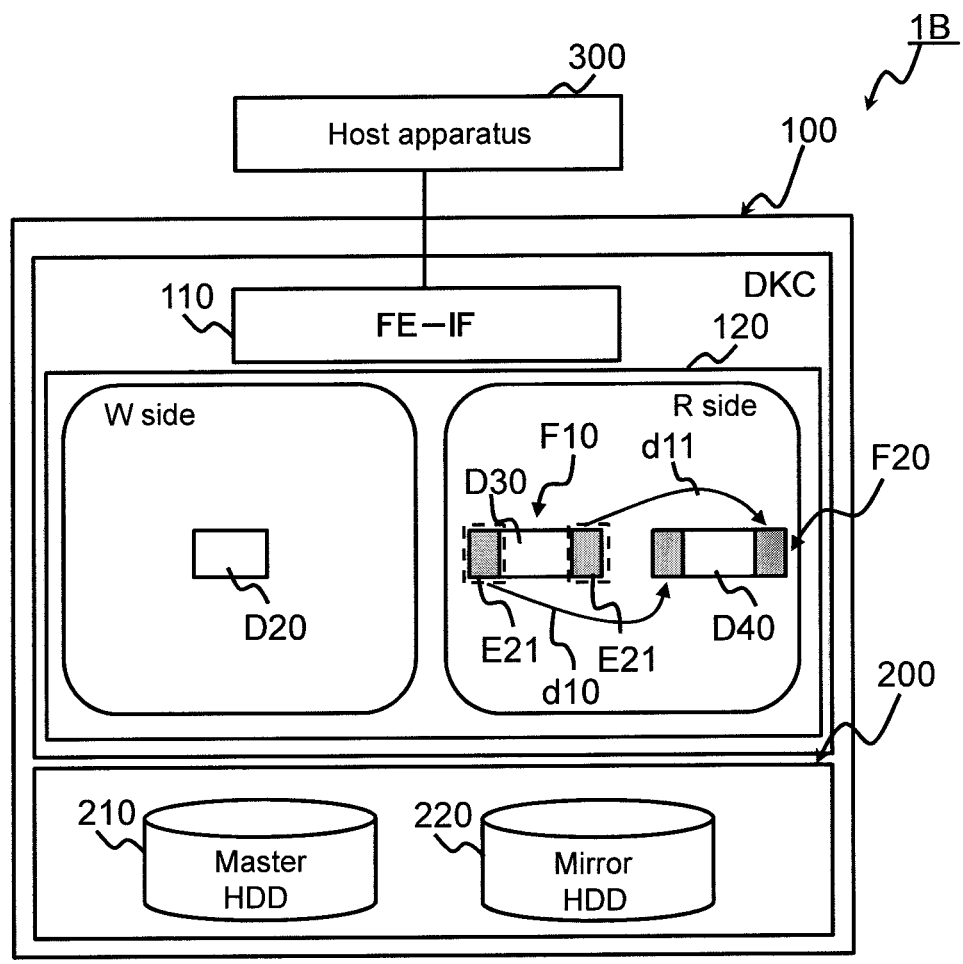
FIG. 7 shows a third part of the above-mentioned write processing related to this embodiment.

Next, the DKC 100, as shown by an arrow c10 in FIG. 6, writes the data set D20 to the staging data [element] E20 and, at the same time, as shown by an arrow c11 in FIG. 6, copies the data set D20 to another segment. According to FIG. 6, for distinguishing the original data set D20 from the copy of the data set D20, to the data sets as the copy of the data set D20, reference signs D30, D40 are respectively added. The attribute of the segment storing the data set D40 is the R side. This is because the data set D40 is exchanged with the HDDs.

A data unit F10 generated by overwriting the staging data [element] E20 with the data set D20 is the data for the master HDD 210. The DKC 100, as shown by arrows d10 and d11 in FIG. 7, adds the staging data parts E21 and E22 in the data unit F10 to the data set D40. By this method, a data unit F20 for the mirror HDD 220 is generated. The data unit F20 is the data conforming to the data unit F10.

Figure 8:
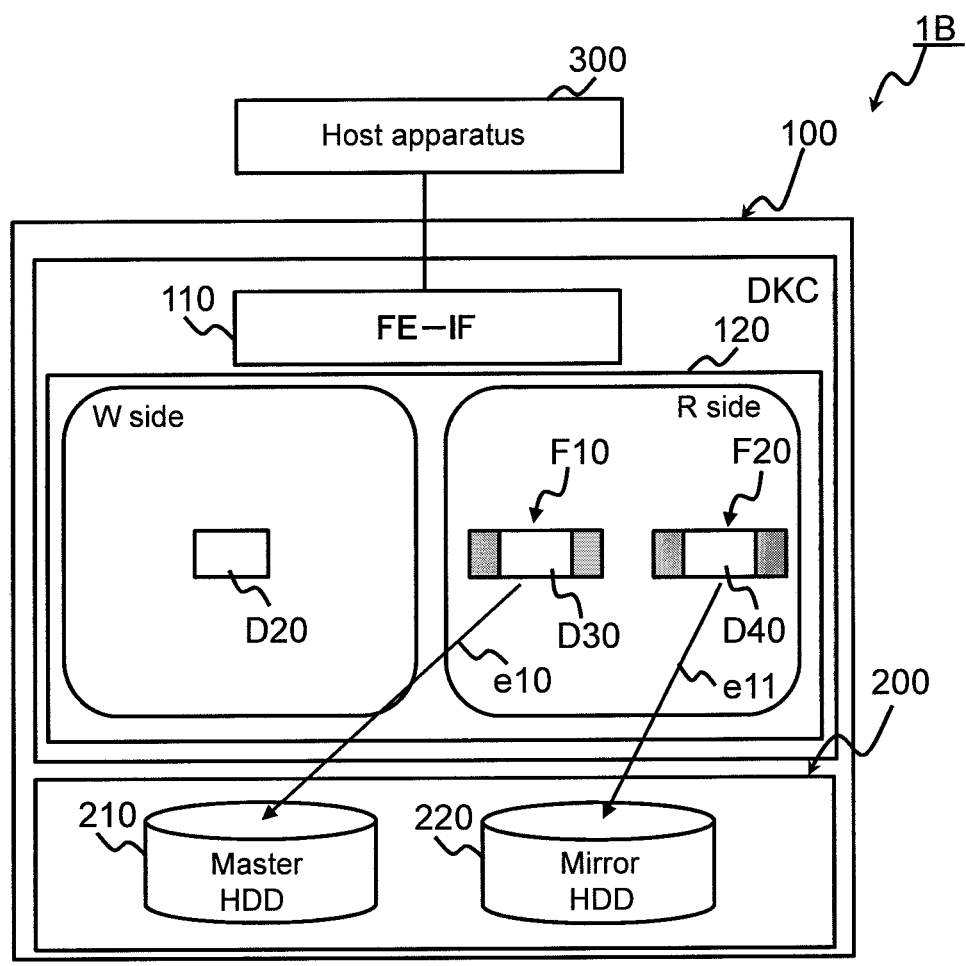
FIG. 8 shows the remaining part of the above-mentioned write processing related to this embodiment.

After that, the DKC 100, as shown by an arrow e10 in FIG. 8, writes the data unit F10 to the master HDD 210 and, as shown by an arrow e11 in FIG. 8, writes the data unit F20 to the mirror HDD 220.

As described above, in the write processing for the RAID group of RAID 1, in accordance with this embodiment, data read from either the master HDD 210 or the mirror HDD 220 becomes unnecessary and, at the same time, the number of times of data read from the RAID group 200 can be one at a maximum.

In the above-mentioned write processing, the data unit F20 may be a copy of the data unit F10, and should preferably be generated by the above-mentioned method. This is because, if a certain failure occurs when the data unit F10 is copied, the generated data unit F20 might possibly become the data which is different from the data unit F10.

Furthermore, in the above write processing, the size of the staging data [element] E20 (a block group as the read source) has only to be equal to or larger than the size of the data set D1 and, at the same time, a multiple of the size of the writing unit of the SATA-HDD, and should preferably be the smallest size in the range. This is for inhibiting the consumption of the cache memory 120. In the above-mentioned example, as the data set D1 is 512 B, the size of the staging data [element] E20 should preferably be 1024 B (512 B×2). The size of the data units F10 and F20 is the same as the size of the staging data [element] E20. The write destination of the data unit F10 is the read source block group of the staging data [element] E20. The write destination of the data unit F20 is a block group corresponding to the read source block group (e.g. a block group of the same address as the read source block group).

Next, with reference to FIG. 9 to FIG. 18 (also with reference to FIG. 5 to FIG. 8 as needed), this embodiment is described in details.

Figure 9:
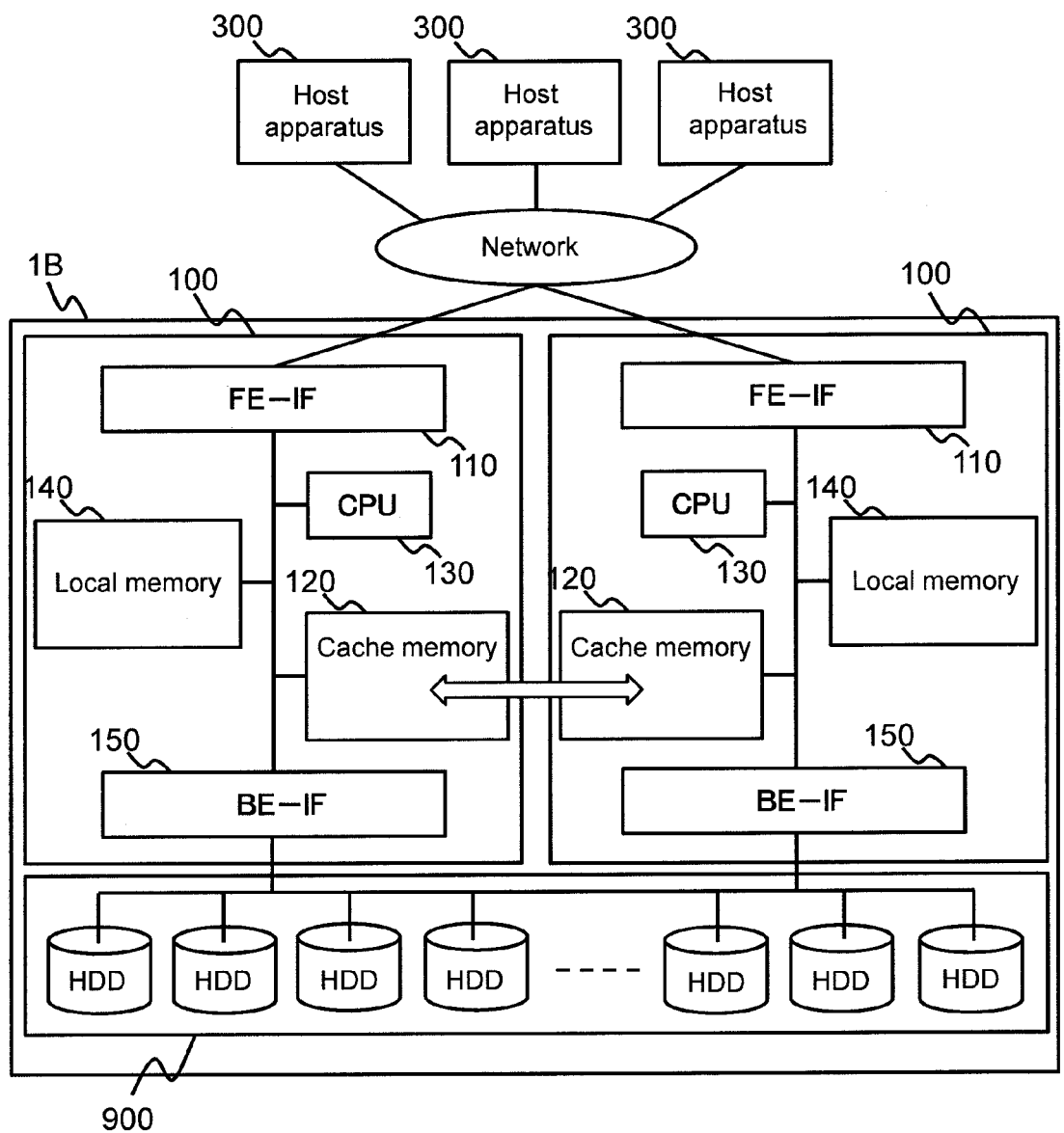
FIG. 9 shows the configuration of a computer system related to this embodiment.

FIG. 9 shows the configuration of a computer system comprising the storage apparatus 1B related to this embodiment.

The storage apparatus 1B comprises duplicated DKCs 100 and an HDD group 900. To the storage apparatus 1B, host apparatuses 300 which are a type of external apparatuses of the storage apparatus 1B and issue I/O (Input/Output) requests are connected.

The DKC 100 comprises an FE-IF (frontend interface apparatus) 110, a cache memory 120, a CPU 130, a local memory 140, and a BE-IF (backend interface apparatus) 150.

The FE-IF 110 and the BE-IF 150 are the communication interface apparatuses for the DKC 100 to exchange data and others with the external apparatuses. The FE-IF 110 communicates with the host apparatuses 300, and the BE-IF 150 communicates with the HDDs. The cache memory 120 is a memory for temporarily storing the data read from or written to the HDDs. The cache memories 120 share part of the data. The local memory 140 stores the information required for the control (hereinafter referred to as management information) and computer programs. The CPU 130 performs the programs stored by the local memory 140 and, in accordance with the management information, controls the storage apparatus 1B.

Of the HDD group 900, one or more RAID groups are configured. At least one RAID group is a RAID group 200, that is, a RAID group of RAID 1. Note that this invention is applicable, as well as to RAID 1, to other types of RAID levels at which data is duplicated and written (that is, other types of RAID levels of RAID 1 series).

Figures 10A, 10B:
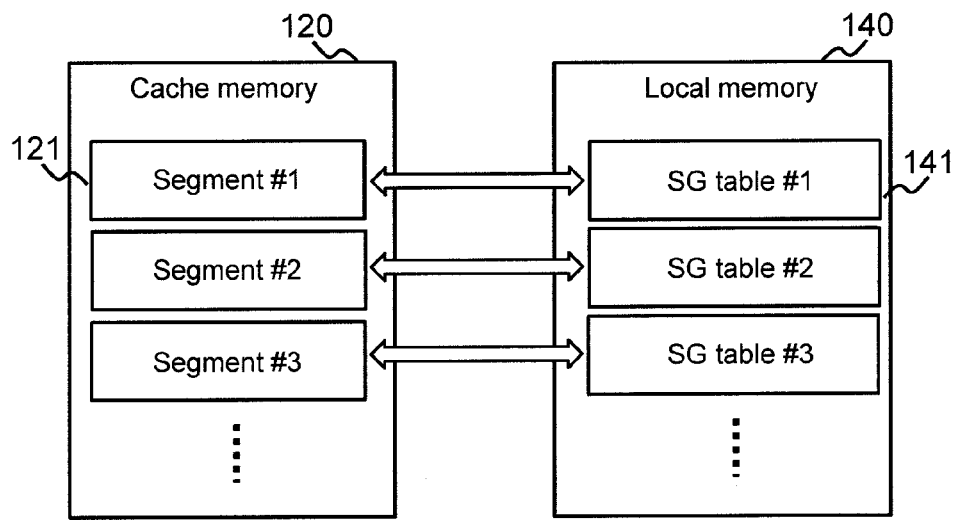
FIG. 10A shows the relationship between segments and segment tables.
FIG. 10B shows the configuration of the segment table.

FIG. 10A shows the configuration of the cache memory 120 and the information which the local memory 140 stores.

The cache memory 120 is configured of multiple segments 121.

The local memory 140 stores multiple segment tables (hereinafter referred to as SG tables) 141. A segment 121 and an SG table 141 correspond 1 to 1. The SG table 141 comprises the information related to the segment 121 corresponding to the same. Note that, instead of an SG table 141 existing for each segment 121, it may also be permitted that a table comprises multiple records and that each record corresponds to a segment 121. Furthermore, the information related to multiple segments 121 may also be expressed in other methods than tables.

FIG. 10B shows the configuration of several SG tables 141.

The SG tables 141, for example, comprise the information below. Note that the description with reference to FIG. 10B focuses on one SG table 141 and, at the same time, refers to the segment corresponding to the SG table 141 as "target segment."

(*) The data 140a which is the information showing the attribute of the data stored in the target segment 121, (*) the data 140b which is the information showing where in the target segment 121 the data is located (as more specifically described, from where to where in the target segment 120 the input/output target data for the HDDs exists), (*) the queue 140c which is the information showing the queue which manages the target segment 121, (*) the attribute 140d which is the information showing the attribute of the target segment 121, and (*) the flag 140e which is the information showing whether the data in the target segment 121 also exists in the other cache memory 120 than the cache memory 120 comprising the target segment 121 or not.

The values of the data 140a (that is, the data in the target segment 121) are "intermediate dirty data," "staging data," and "physical dirty data." The "intermediate dirty data" is a type of data which exists in the cache memory 120 but not in the HDDs (dirty data) and which must not be written to the HDDs yet. The intermediate dirty data is, as more specifically described, for example, an above-mentioned data set (a set of a 512 B data element and an 8 B guarantee code). The "staging data" is, as described above, the data read from the HDDs to the cache memory 120. The "physical dirty data" is a type of dirty data and which may be written to the HDDs.

The "queue" referred to in this embodiment is, though not shown in the figure, for example, the information in which multiple entries are aligned in a specified order. Each entry corresponds to a segment and comprises the information related to the corresponding segment. The order of the entries is, for example, the order of the points of time at which data [elements] are newly stored. In this embodiment, the queues are, for example, an intermediate dirty queue, a clean queue, a free queue, and a physical dirty queue. The intermediate dirty queue is configured of entries corresponding to the segments where the intermediate dirty data [elements] are stored. The clean queue is configured of entries corresponding to the segments where the clean data [elements] are stored. A type of clean data is staging data. The free queue is configured of entries corresponding to free segments. The physical dirty queue is configured of entries corresponding to the segments where the physical dirty data [elements] are stored.

As for the flag 140e, ON (e.g. "1") indicates that the data in the target segment 121 also exists in the other cache memory 120 while OFF (e.g. "0") indicates that the data in the target segment 121 does not exist in the other cache memory 120.

In the write processing, a segment group (one or more segments) is secured from the cache memory 120, and the data is written to the secured segment group, wherein the size of the secured segment group is a common multiple of the unit size of the write target data and the size of the writing unit of the SATA-HDD, more preferably the least common multiple. As more specifically described, as the unit size of the write target data is 520 B and the size of the writing unit of the SATA-HDD is 512 B, the size of the secured segment group is 32 kB (kilobytes) which is the least common multiple of 520 B and 512 B. Therefore, for example, if the segment size is 4 kB, 8 segments are considered to be secured while, if the segment size is 8 kB, 4 segments are assumed to be secured (hereinafter, the segment size is assumed to be 8 kB).

As described above, the case where, by securing a segment group of 32 kB (the size of the least common multiple) and processing [the data] in units of segment groups, it becomes unnecessary to read staging data from the HDDs (that is, the case where the number of times of read can be made 0) can be expected. That case is described in details with reference to FIG. 11.

Figure 11:
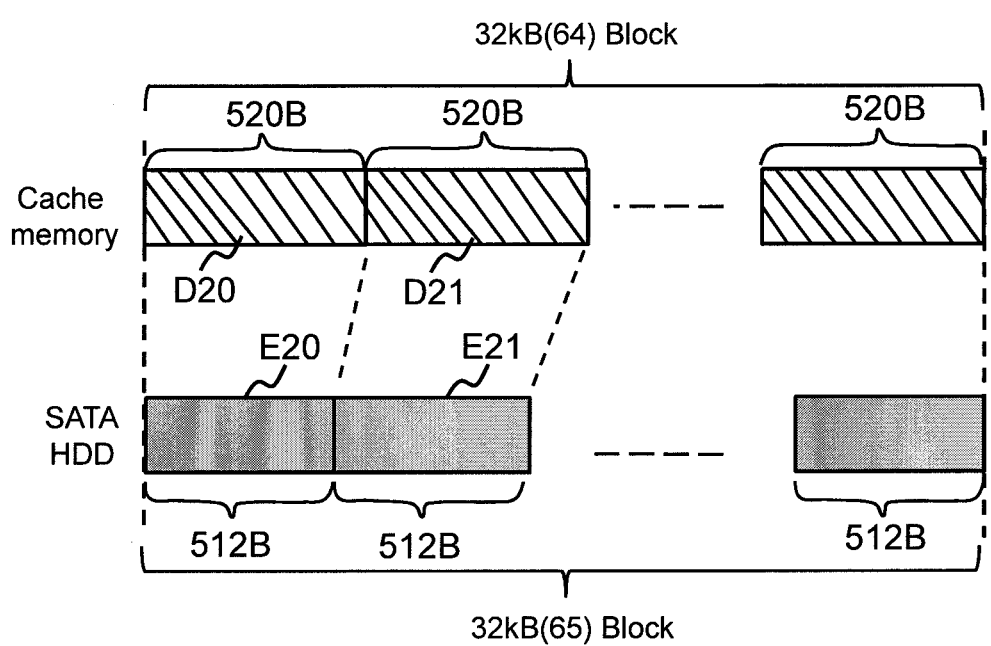
FIG. 11 is a diagram showing that, if multiple sequential 520 B cache blocks and multiple sequential 512 B SATA blocks are aligned, the borders match every 32 kB.

As shown in FIG. 11, each segment is configured of multiple 520 B cache blocks. In a cache block, a 520 B data set (a set of a 512 B data element and an 8 B guarantee code) is stored.

If multiple sequential cache blocks and multiple sequential SATA blocks (SATA-HDD blocks) are assumed to be aligned with the heads lined up, the borders of the cache blocks and the borders of the SATA blocks match every 32 kB.

Furthermore, 32 kB is a multiple of 512 B which is the size of the writing unit of the SATA-HDD. Therefore, if the size of the write target data is 32 kB, the write target data can be written in accordance with the writing unit of the SATA-HDD.

Therefore, if the data sets (520 B intermediate dirty data [elements]) are stored in all the cache blocks for 32 kB (that is, if the intermediate dirty data exists serially from the head to the end of the 32 kB segment group), as the write target data is the 32 kB data (the data configured of 64 sequential data sets), the write processing can be completed without performing reading staging data from the HDDs.

As described above, if a segment group is secured in units of 32 kB, the case where read from the HDDs becomes unnecessary can be expected. Note that the size of the secured segment group may also be other common multiples of 512 B and 520 B than 32 kB, but should preferably be the least common multiple from the perspective of inhibiting the consumption of the cache memory 120.

Hereinafter, with reference to FIG. 12A to FIG. 12F and FIG. 13A to FIG. 13F, the relationship between the example of the alignment of data sets in a 32 kB segment group and the range of staging data. Note that, in FIG. 12A to FIG. 12F and FIG. 13A to FIG. 13F, shaded objects indicate intermediate dirty data (one or more data sets) and gray objects indicate staging data or part of the same.

Figure 12A:
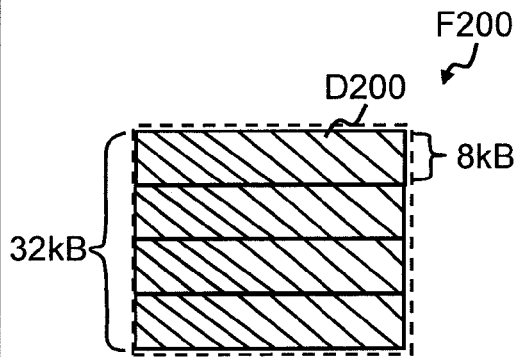
FIG. 12A shows a first example of the alignment of intermediate dirty data in a segment group W.

According to the example shown in FIG. 12A, sequential intermediate dirty data D200 exists in an entire 32 kB segment group. In this case, as described above, as it is unnecessary to read staging data, staging data is not read (refer to FIG. 13A). According to this example, the sequential intermediate dirty data D200 is the data unit F200 to be written to the HDDs.

Figure 12B:
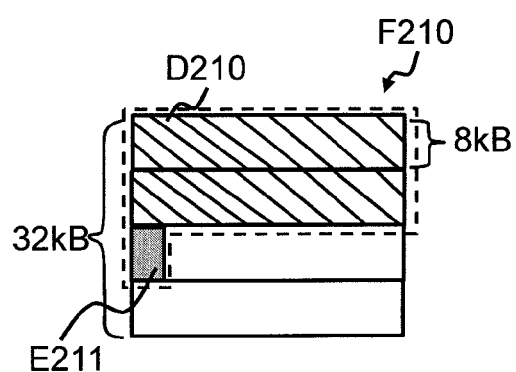
FIG. 12B shows a second example of the alignment of intermediate dirty data in a segment group W.
Figure 12C:
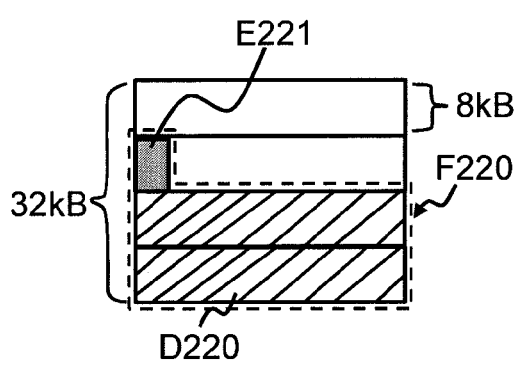
FIG. 12C shows a third example of the alignment of intermediate dirty data in a segment group W.

According to the examples shown in FIG. 12B and FIG. 12C, the sequential intermediate dirty data matches one border of the segment group, either the head or the end, but does not match the other border. As more specifically described, according to the example shown in FIG. 12B, sequential intermediate dirty data D210, which does not match the end border of the segment group, matches the head border of the segment group. In this case, the staging data E210 whose size is larger than the sequential intermediate dirty data D210 is read (refer to FIG. 13B), the data unit F210 to be written to the HDDs is generated, in which data unit F210, the staging data part E211 is added to the end of the sequential intermediate dirty data D220. Furthermore, according to the example shown in FIG. 12C, the sequential intermediate dirty data D220 does not match the head border of the 32 kB segment group, but matches the end border of the segment group. In this case, the staging data E220 whose size is larger than the sequential intermediate dirty data D220 is read (refer to FIG. 13C), the data unit F220 to be written to the HDDs is generated, in which data unit F220, the staging data part E221 is added to the head of the sequential intermediate dirty data D220.

Figure 12D:
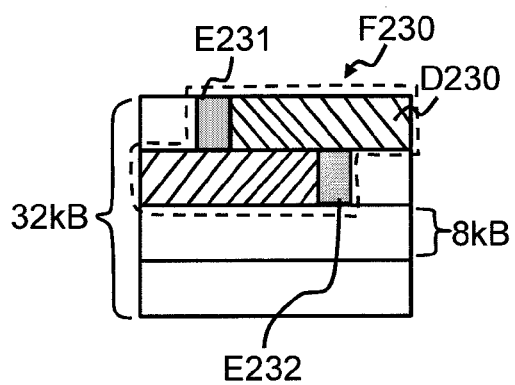
FIG. 12D shows a fourth example of the alignment of intermediate dirty data in a segment group W.

According to the example shown in FIG. 12D, the sequential intermediate dirty data D230 matches neither the head border nor the end border of the segment group. In this case, the staging data E230 whose size is larger than the sequential intermediate dirty data D230 is read (refer to FIG. 13D), the data unit F230 to be written to the HDDs is generated, in which data unit F230, staging data parts E231 and E232 are added to the head and the end of the sequential intermediate dirty data D230.

Figure 12E:
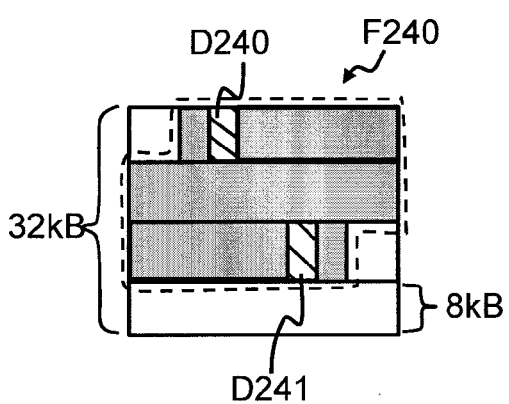
FIG. 12E shows a fifth example of the alignment of intermediate dirty data in a segment group W.
Figure 12F:
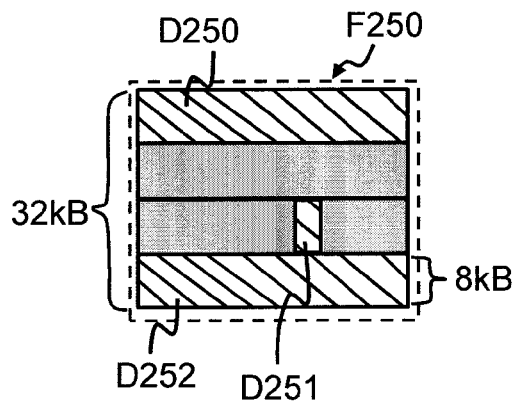
FIG. 12F shows a sixth example of the alignment of intermediate dirty data in a segment group W.
Figure 13A:
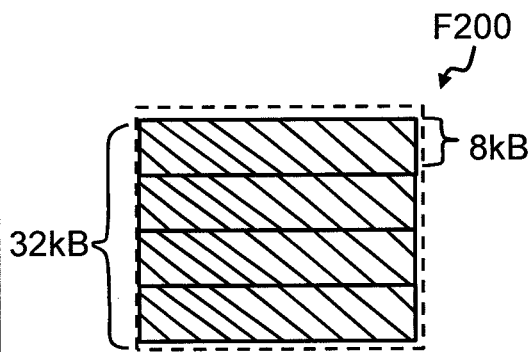
FIG. 13A shows staging data read corresponding to the example shown in FIG. 12A.
Figure 13B:
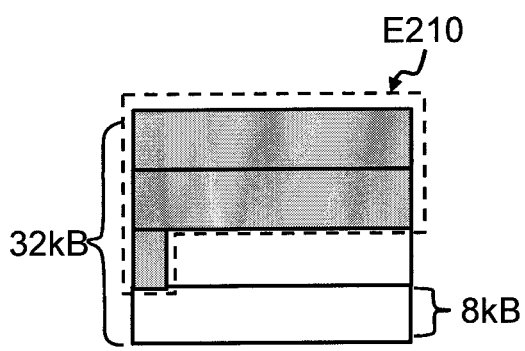
FIG. 13B shows staging data read corresponding to the example shown in FIG. 12B.
Figure 13C:
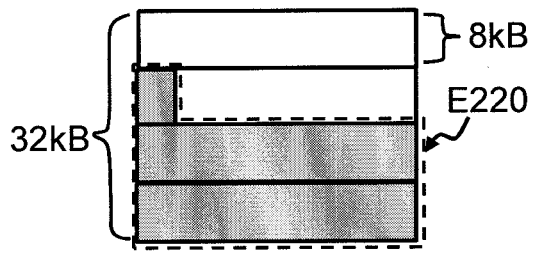
FIG. 13C shows staging data read corresponding to the example shown in FIG. 12C.
Figure 13D:
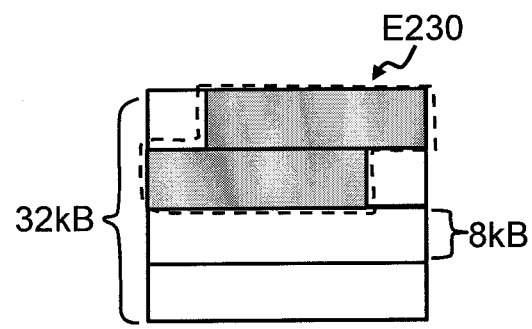
FIG. 13D shows staging data read corresponding to the example shown in FIG. 12D.
Figure 13E:
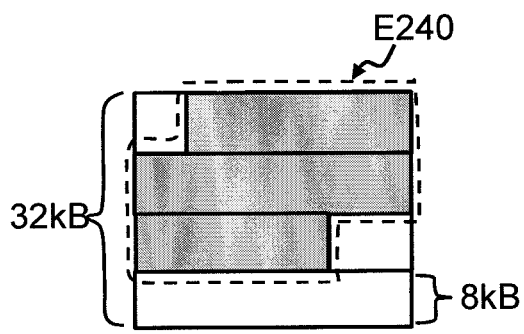
FIG. 13E shows staging data read corresponding to the example shown in FIG. 12E.
Figure 13F:
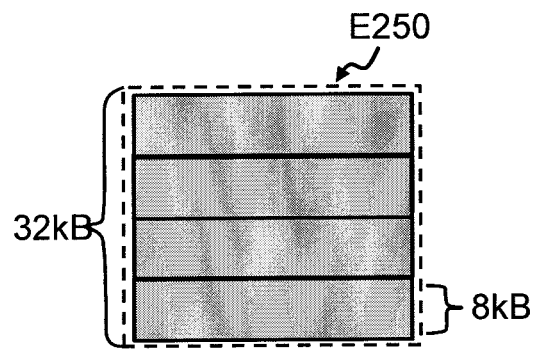
FIG. 13F shows staging data read corresponding to the example shown in FIG. 12F.

According to the examples shown in FIG. 12E and FIG. 12F, in the segment group, the intermediate dirty data is non-sequential. In this case, instead of the staging data larger than the intermediate dirty data being read in units of respective intermediate dirty data [elements], the staging data whose size is equal to or larger than the range from the head of the head intermediate dirty data to the end of the end intermediate dirty data is read. This is for making the number of times of read one at a maximum. Therefore, according to the example in FIG. 12E, the staging data E240 whose size is larger than the range from the head of the head intermediate dirty data D240 to the end of the end intermediate dirty data D241 is read (refer to FIG. 13E). In accordance with the intermediate dirty data D240 and D241 and the staging data E240, the data unit F240 to be written to the HDDs is generated. Furthermore, according to the example in FIG. 12F, the head of the head intermediate dirty data D250 matches the head border of the segment group, and the end of the end intermediate dirty data D252 matches the end border of the segment group. Therefore, the 32 kB staging data E250 is read (refer to FIG. 13F). In accordance with the intermediate dirty data D250, D251 and D252 and the staging data E250, the data unit F241 to be written to the HDDs is generated. As described above, if the intermediate dirty data is non-sequential in the segment group, the staging data whose size is equal to or larger than the range from the head of the head intermediate dirty data to the end of the end intermediate dirty data is read. In the data units F240 and F250 to be written to the HDDs, the area in between the intermediate dirty data comes to be filled with the staging data part.

The four segments (8 kB each) configuring the above-mentioned segment group (32 kB) do not necessarily have to be sequential in the cache memory 120. For example, four segments separated in the cache memory 120 may also be secured as a segment group.

Next, with reference to FIG. 14 to FIG. 17, the detailed flow of the intermediate summarized write processing in the write processing for the RAID group of RAID 1 is described. The intermediate summarized write processing is the processing since a data set (a set of a data element (512 B) from the host apparatus 300 and a guarantee code (8 B)) is generated until a data unit is written to the HDDs.

Figure 15:
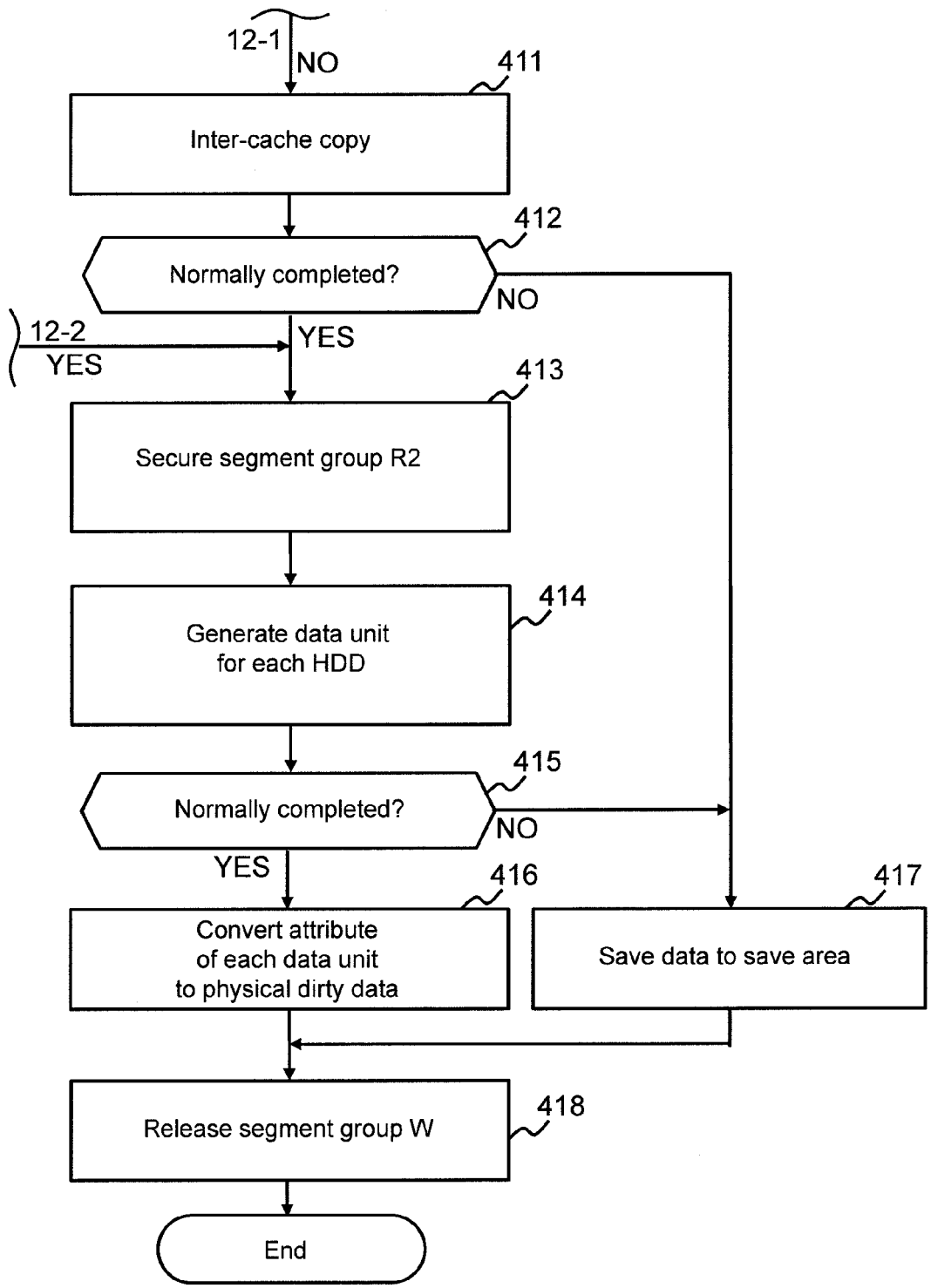
FIG. 15 is a flowchart showing the remaining part of the above-mentioned write processing related to this embodiment.

FIG. 14 and FIG. 15 show the flow of the intermediate summarized write processing. Note that, hereinafter, for simplifying the description, the intermediate dirty data stored in the segment of one W side is assumed to be the write target data.

The CPU 130, for each of the multiple intermediate dirty queues, checks the amount of the intermediate dirty data, and determines which intermediate dirty queue should be the target of the processing (Step 401). For example, the intermediate dirty queue whose amount of intermediate dirty data is determined to be the largest (for example, the intermediate dirty queue comprising the largest number of entries) is determined as the target of the processing. The intermediate dirty queues, for example, exist in specified units (for example, in each HDD, or in each area (such as a partition) into which the cache memory 120 is logically partitioned).

Next, the CPU 130, among the intermediate dirty data managed by the intermediate dirty queue determined at Step 401, identifies the intermediate dirty data stored in the cache memory 120 the least recently (Step 402). The SG table #1 corresponding to the segment #1 storing the intermediate dirty data identified at this point is as shown in row #1 in FIG. 16 at Step 401, and is as shown in row #2 in FIG. 16 at Step 402.

Next, the CPU 130 secures the 32 kB segment group including the segment #1 (Step 403). The segment group secured at this point is hereinafter referred to as a "segment group W." For the secured segment group W, exclusive control is performed for ensuring no data is written to the same. The SG table #1 at this step is as shown in row #3 in FIG. 16. The other segments configuring the segment group W may be any type of segments. For example, a segment in which the intermediate dirty data not identified at Step 402 is stored may also be permitted. Furthermore, if the size of the intermediate dirty data as the write target is larger than 32 kB, two or more 32 kB segment groups may also be secured.

Next, the CPU 130 registers the information showing the physical dirty reserved number to, for example, the local memory 140 (Step 404). As more specifically described, the CPU 130 considers the value twice the number of intermediate dirty segments (the segments in which the intermediate dirty data is stored in the segment group W) as the physical dirty reserved number. The reasons for doubling the number of intermediate dirty segments are that the data units including the copies of the intermediate dirty data are managed as the physical dirty data eventually, and that two copies of the intermediate dirty data are generated (generated both for the master HDD 210 and the mirror HDD 220). The CPU 130, by summing the physical dirty reserved number and the number of segments where the physical dirty data already exist, and if the total number exceeds a specified value, may suspend the operation of generating physical dirty data. Note that the SG table #1 at this Step 404 is as shown in row #4 in FIG. 16.

Next, the CPU 130 determines the RAID level of the RAID group which is the write destination of the write target intermediate dirty data (Step 405). The SG table #1 at this Step 405 is as shown in row #5 in FIG. 16.

If the RAID level is not of RAID 1 series (Step 405: NO), the CPU 130 processes the intermediate dirty data in accordance with the RAID level (Step 406).

If the RAID level is of RAID 1 series (Step 405: YES), the CPU 130 determines whether staging data is required or not (Step 407). The SG table #1 at this Step 407 is as shown in row #6 in FIG. 16.

The result of the determination at Step 407 is, if the intermediate dirty data occupies the entire area of the segment group W (refer to FIG. 12A), becomes negative (Step 407: NO) and otherwise, becomes positive (Step 407: YES).

The CPU 130, if requiring staging data (Step 407: YES), secures the segment group (hereinafter referred to as the segment group R1) for storing the staging data from the cache memory 120 (Step 408). The SG table #1 at this Step 408 is as shown in row #7 in FIG. 16. In row #7, as well as the SG table #1, the SG table #2 corresponding to a segment #2 in the segment group R1 (the SG table #2 at Step 408) is also shown. Note that the CPU 130, if the segment group R1 cannot be secured, suspends the read of the staging data.

Next, the CPU 130, from the status of the intermediate dirty data, determines the SATA block group as the read source of the staging data in the master HDD 210 (or the mirror HDD 220) and, from the entire area of the determined SATA block group, reads the staging data to the segment group R1 (Step 409). The status of the intermediate dirty data (for example, the status shown in FIG. 12A to FIG. 12F) can be determined from the map 140b in the multiple SG tables corresponding to the segment group W. Furthermore, the read source SATA block group is the SATA block group including the write destination of the intermediate dirty data. Furthermore, the size of the read source SATA block group is the smallest size in the range equal to or larger than the size of the intermediate dirty data (also the multiple of the size of the SATA block). At this Step 409, the SG tables #1 and #2 are as shown in row #8 in FIG. 16. As more specifically described, as the staging data is maintained in both of the cache memories 120 in the duplicated DKCs 100, the flag 140e is "1."

The CPU 130 determines whether the intermediate dirty data in the segment group W is sequential or not (Step 410). The SG tables #1 and #2 at this Step 410 are as shown in row #9 in FIG. 16.

Figure 18:
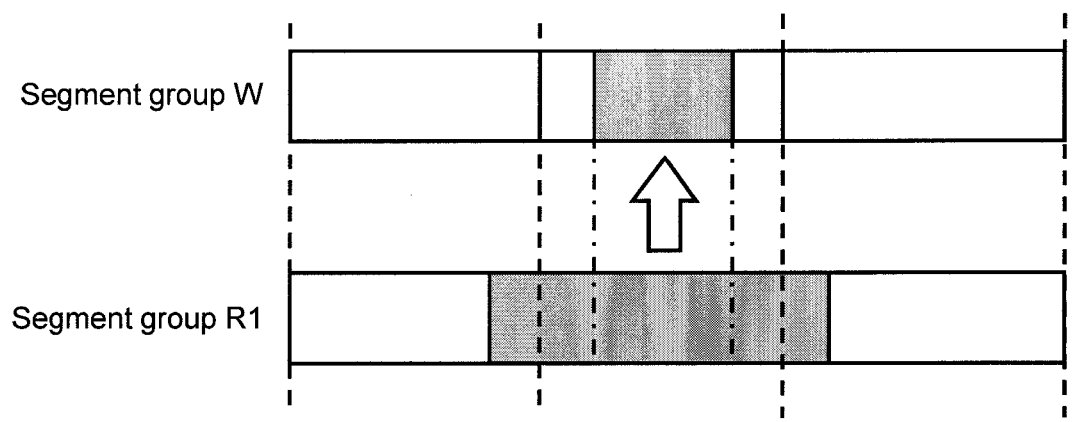
FIG. 18 is an explanatory diagram of inter-cache copy.

If the intermediate dirty data is non-sequential (Step 410: NO), the CPU 130 performs inter-cache copy (Step 411 in FIG. 15). As more specifically described, as shown in FIG. 18, the CPU 130, for filling [the area] in between the intermediate dirty data with the staging data part, copies the staging data part in the segment group R1 to the segment group W. By this method, the sequential data for the copy from the segment group W to the segment group R2 which is described later is created. Note that the SG tables #1 and #2 at this Step 411 are as shown in row #10 in FIG. 16.

The CPU 130 determines whether the staging data part is normally copied to the segment group W or not (Step 412). The SG tables #1 and #2 at this Step 410 are as shown in row #11 in FIG. 16.

The CPU 130, if the inter-cache copy is normally completed (Step 412: YES), performs Step 413 and the following steps. Meanwhile, the CPU 130, if the inter-cache copy is not normally completed (Step 412: NO), performs Step 417. At Step 417, the CPU 130 stores the data of which copy is not successful in a specified save area (e.g. a non-volatile storage area). For the data in this save area, by the CPU 130, later, the copy (generating a data unit) may be performed again (that is, the data may also be copied from the save area to the segment group W, R1 or R2). The save area may be comprised by the DKC or a part of the HDDs may also be used [as the save area].

If the inter-cache copy is normally completed (Step 412: YES), the CPU 130 secures the segment group (hereinafter referred to as the segment group R2) for the mirror HDD from the cache memory 120 (Step 413). The SG tables #1 and #2 at this Step 413 are as shown in row #12 in FIG. 17. In row #12, as well as the SG tables #1 and #2, the SG table #3 corresponding to a segment #3 in the segment group R2 (the SG table #3 at Step 413) is also shown. Note that the CPU 130, if the segment group R2 cannot be secured, suspends the processing. Otherwise, [the CPU 130] may also perform the processing such as writing physical dirty data to the HDDs for increasing free segments.

The CPU 130 generates a data unit to be written to the master HDD 210 and a data unit to be written to the mirror HDD 220 (Step 414). The SG tables #1 to #3 at this Step 414 are as shown in row #13 in FIG. 14. Note that "dirty map+" in the map 140b indicates that the data managed in the SG tables #2 and #3 are the same.

At Step 414, for example, the processing below is performed.

(*) The CPU 130 overwrites the staging data in the segment group R1 with the sequential data in the segment group W and, at the same time, copies the sequential data to the segment group R2. By this method, in the segment group R1, a data unit for the master HDD 210 (hereinafter referred to as a master data unit) is generated and, at the same time, sequential data comes to exist in the segment group R2. Note that the sequential data in the segment group W might be configured of sequential intermediate dirty data or might also be configured of non-sequential intermediate dirty data and an staging data part.

(*) The CPU 130 copies the staging data part in the segment group R1 (the part of the staging data which is not overwritten with the sequential data) to the segment group R2. By this method, in the segment group R2, a data unit for the mirror HDD 220 (hereinafter referred to as a mirror data unit) is generated.

The CPU 130 determines whether the generation of the master data unit or the mirror data unit is normally completed or not (Step 415). The SG tables #1 to #3 at this Step 414 are as shown in row #14 in FIG. 14.

The CPU 130, if [the generation of] at least one of the master data unit and the mirror data unit is not completed normally (Step 415: NO), performs the processing of the above-mentioned Step 417.

The CPU 130, if the generation of the master data unit and the mirror data unit is completed normally (Step 415: YES), transits the attributes of the master data unit and the mirror data unit to physical dirty data respectively (Step 416). As more specifically described, for example, the CPU 130 ensures the management of one or more segments storing master data units and one or more segments storing mirror data units by physical dirty queues. Note that the SG tables #1 to #3 at this Step 416 are as shown in row #15 in FIG. 14.

After that, the CPU 130 releases the segment group W (Step 418). By this method, each segment configuring the segment group W is managed as a free segment. The free segments can be secured. The SG tables #1 to #3 at this Step 418 are as shown in row #16 in FIG. 14. According to the SG table #1 in row #16, the segment #1 in the released segment group W is managed as a free segment.

The flow of the intermediate summarized write processing is as described above. After this intermediate summarized write processing, the CPU 130 writes the master data unit (physical dirty data) to the master HDD 210 and, at the same time, writes the mirror data unit (physical dirty data) to the mirror HDD 220.

According to this embodiment, in the write processing for the RAID group of RAID 1, reading staging data from either the master HDD or the mirror HDD can be made unnecessary and, at the same time, the number of times of read can be made one at a maximum. By this method, the load on both the HDDs and the DKC 100 can be reduced.

Though an embodiment of this invention is described above, this invention is not limited to this embodiment and, as a matter of course, also comprises any changes or modifications within the spirit and scope hereof.

For example, if the entire area of the segment group W is occupied by the sequential intermediate dirty data, it may also be permitted that the intermediate dirty data in the segment group W is managed as the physical dirty data, and then the physical dirty data is written to the master HDD (or the mirror HDD). In other cases, it may also be permitted that the segment group R1 is secured, the data copy from the segment group W to the segment group R1 is performed, the data in the segment group R1 is managed as physical dirty data, and then, the physical dirty data is written to the master HDD (or the mirror HDD).

REFERENCE SIGN LIST

1B Storage apparatus

The invention claimed is:

1. A storage apparatus, comprising:
a RAID (Redundant Array of Independent (or Inexpensive) Disks) group configured of multiple physical storage devices; and
a controller which, in accordance with a RAID level of the RAID group, controls data write to the RAID group and data read from the RAID group,
wherein the RAID group is a RAID group of a RAID 1 series which has one or more pairs of first storage devices and second storage devices,
a unit size of write target data and a size of a writing unit of each of the storage devices are different,
a storage area provided by each of the storage devices is configured of multiple storage blocks,
a size of each storage block is the same as a size of the writing unit of each of the storage devices, and
wherein the controller
(A) reads data from the entire area of a first storage block group including a write destination of the write target data in the first storage device,
(B) generates, based on the write target data and staging data which is the data read in the (A), one or more data units, each of which is the data configured of the write target data or a copy thereof and a staging data part or a copy thereof and having the same size as the first storage block group, and
(C) writes any of the one or more data units to the first storage block group of the first storage device, and, at the same time, writes any of the one or more data units to a second storage block group which corresponds to the first storage block group and has the same size as the first storage block group in the second storage device.

2. The storage apparatus according to claim 1, wherein
in the (B), the controller generates a first data unit by writing the write target data or the copy thereof to the staging data, and generates a second data unit by generating a copy of the write target data and adding a copy of the staging data part within the first data unit to the copy of the write target data, and
in the (C), the controller writes either one of the first and second data units to the first storage block group, and writes the other of the first and second data units to the second storage block group.

3. The storage apparatus according to claim 2,
wherein the controller has a cache memory configured of multiple cache blocks,
a size of each cache block is the unit size of the write target data,
in the (A), the controller secures, from the cache memory, a first cache area including one or more cache blocks having the write target data stored therein,
in the (A), the controller secures a second cache area from the cache memory,
in the (A), the controller reads the staging data to the second cache area,
in the (B), the controller secures a third cache area,
in the (B), the controller generates the first data unit by copying the write target data in the first cache area to the second cache area,
in the (B), the controller generates the second data unit by copying the staging data part in the second cache area to the third cache area,
each of the cache areas is configured of two or more cache blocks, and
a size of each cache area is a least common multiple of the size of each of the storage blocks and the size of each of the cache block.

4. The storage apparatus according to claim 3, wherein when the entire area of the first cache area is occupied by the write target data that is sequential, the controller does not read the staging data, and the first data unit and the second data unit are copies of the write target data.

5. The storage apparatus according to claim 3, wherein when there is the write target data that is not sequential in the first cache area, a size of the first storage block group is a size that is equal to or larger than a range from a head of head write target data in the first cache area to an end of end write target data in the first cache area.

6. The storage apparatus according to claim 5, wherein
in the (B), the controller copies the staging data part from the second cache area to the first cache area so that sequential data is generated by filling in an area between write target data in the first cache area with the staging data part,
the sequential data is configured of the non-sequential write target data and the staging data part,
in the (B), the controller generates the first data unit by copying the sequential data to the second cache area, and
in the (B), the controller copies the sequential data to the third cache area.

7. The storage apparatus according to claim 3, further comprising a save area which is a storage area in which data is saved,
wherein, when the first or second data unit is not generated normally, the controller temporarily writes data used for the generation of the first or second data unit to the save area, and
the controller copies the data within the save area to either the second cache area or the third cache area in which the data unit that is not generated normally is stored.

8. The storage apparatus according to claim 3, wherein
the unit size of the write target data is a size of a data set which is a set of data from a host apparatus and a guarantee code, and
the storage device is a SATA-HDD.

9. The storage apparatus according to claim 1, wherein the size of the first storage block group is a smallest size in a range equal to or larger than the size of the write target data.

10. The storage apparatus according to claim 1, wherein when the write target data is sequential data and the size thereof is a common multiple of the unit size of the write target data and a size of the writing unit of each of the storage devices, the controller does not read the staging data, and the data unit is a copy of the write target data.

11. The storage apparatus according to claim 1, wherein
when the write target data is not sequential in a predetermined range, the size of the first storage block group is a size equal to or larger than a range from a head of head write target data in the predetermined range to an end of end write target data in the predetermined range.

12. The storage apparatus according to claim 11, wherein
the one or more data units include a first data unit and a second data unit,
in the (B), the controller copies the staging data part so that sequential data is generated by filling in an area between the write target data in the predetermined range with the staging data part,
the sequential data is configured of the non-sequential write target data and the staging data part, in the (B), the controller generates the first data unit by writing the sequential data onto the staging data, in the (B), the controller generates the second data unit by generating a copy of the sequential data and adding the staging data part of the first data unit to the copy of the sequential data, and in the (C), the controller writes either one of the first and second data units to the first storage block group, and writes the other of the first and second data units to the second storage block group.

13. The storage apparatus according to claim 1, further comprising a save area which is a storage area in which data is saved, wherein, when the data unit is not generated normally, the controller temporarily writes data used for the generation of the data unit to the save area, and the controller generates the data unit by using the data within the save area.

14. A control method of writing to a RAID group of a RAID 1 series which has one or more pairs of first storage devices and second storage devices, the method comprising the steps of:

reading data from the entire area of a first storage block group including a write destination of write target data in the first storage device, generating, based on the write target data and staging data which is the read data, one or more data units, each of which is the data configured of the write target data or a copy thereof and a staging data part or a copy thereof and having the same size as the first storage block group, and writing any of the one or more data units to the first storage block group of the first storage device, and, at the same time, writing any of the one or more data units to a second storage block group which corresponds to the first storage block group and has the same size as the first storage block group in the second storage device.

* * * * *